United States Patent [19]
Sable

[11] 3,819,373
[45] June 25, 1974

[54] APPARATUS FOR DETERMINING EXPOSURE PARAMETERS FOR MAKING PRINTS FROM COLOR TRANSPARENCIES

[75] Inventor: Arthur J. Sable, Boulder, Colo.

[73] Assignee: Sable Photo Works, Inc., Boulder, Colo.

[22] Filed: May 8, 1972

[21] Appl. No.: 251,051

[52] U.S. Cl. .......... 96/23, 96/24, 355/35
[51] Int. Cl. .......... G03c 1/16
[58] Field of Search .......... 355/35; 96/23, 24

[56] References Cited

UNITED STATES PATENTS

| | | | |
|---|---|---|---|
| 3,184,307 | 5/1965 | Letzer | 96/23 |
| 3,585,029 | 6/1971 | Neale | 96/23 |

*Primary Examiner*—Norman G. Torchin
*Assistant Examiner*—Richard L. Schilling
*Attorney, Agent, or Firm*—Edwards, Spangler, Wymore & Klaas

[57] ABSTRACT

This invention relates to a method and apparatus for determining a set of exposure parameters for making prints from positive or negative color transparencies. The apparatus comprises diffusion means for breaking up the full-color image to a degree where integrated component illumination readings may be taken thereof; filter means operative to selectively pass red, blue or green light; illumination-level comparison means operative to indicate when the level of illumination of two like color components equal one another; a calibrated light-flux attenuator of a type adapted to cooperate with the illumination level comparison means to define the time interval correction necessary to equate the total quantity of light delivered by like components at different levels of illumination; and, an uncalibrated light-flux attenuator adapted to vary the level of illumination of all three color components of a full-color projected image equally either up or down and in so doing cooperate with the illumination level comparison means to validate the scale of the calibrated light-flux attenuator. The novel method comprises choosing a time interval for one of the three primary color components of the unknown transparency equal to that of the like component of the standard transparency found to produce a satisfactory response in the color print-making material; attenuating the light-flux of the chosen component of the unknown transparency to the same predetermined degree said component was attenuated in the standard transparency for calibration purposes; matching the level of illumination of the chosen component of the unknown transparency to the reference level of the like component of the standard transparency by changing the levels of illumination of all three components to the same degree independently of the previous attenuation; matching the level of illumination of a second component of the unknown transparency to the reference level of illumination of the like component of the standard transparency by independently varying the level of illumination of said second component relative to the other two; correcting the exposure time for said second component by the interval necessary to compensate for the degree to which the level of illumination thereof had to be changed before it matched the reference level of illumination of the like component from the standard transparency; matching the level of illumination of the third component of the unknown transparency to the reference level of illumination of the like component of the standard transparency by independently varying the level of illumination of said third component relative to the first and second; and, correcting the exposure time for said third component by the interval necessary to compensate for the degree to which the level of illumination thereof had to be changed before it matched the reference level of illumination of the like component from the standard transparency.

16 Claims, 2 Drawing Figures

Figure 1:
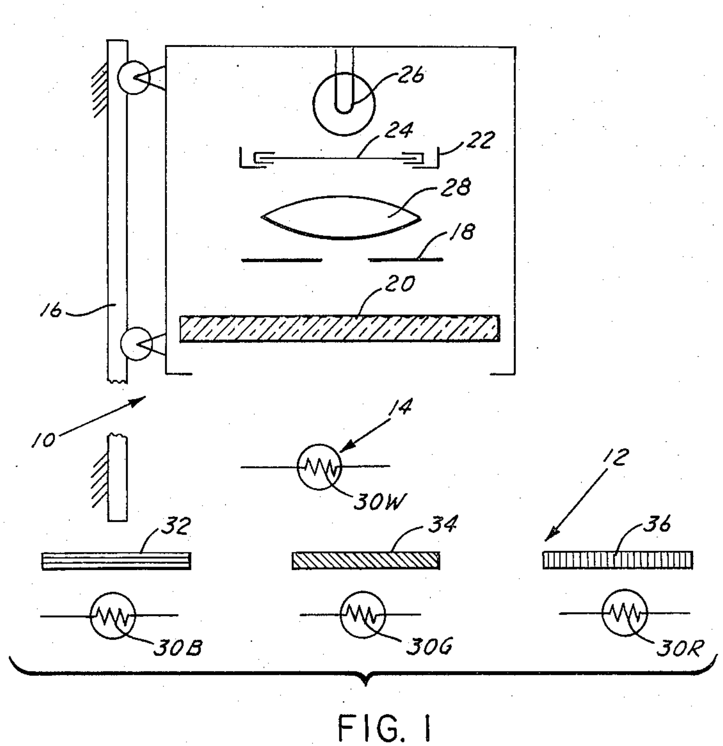

APPARATUS FOR DETERMINING EXPOSURE PARAMETERS FOR MAKING PRINTS FROM COLOR TRANSPARENCIES

In making a black-and-white print, an amateur photographer with just a smattering of darkroom experience can do a fairly good job of guessing the proper exposure based upon past experience. In the event of a bad guess, not much is lost in the way of either time or effort as it is a simple matter to make a second print introducing the appropriate exposure correction. A common procedure is, of course, to expose a test strip at various exposure times and pick the best one. Such a procedure eliminates most of the guesswork and also arrives at near optimum results without the need for special exposure analysis equipment. A more sophisticated procedure is to use an exposure analyzer to determine the optimum exposure with reference to a preselected standard negative.

Unfortunately none of the foregoing techniques is a practical answer to producing a satisfactory color print. While the conventional black-and-white exposure analyzer can be used to determine an overall time interval which, at a particular aperture setting, would result in a print with about the same range of tonal values as that made from the standard transparency, it tells nothing about the color balance. As for the latter, it is virtually impossible to arrive at the relative levels of illumination of the red, blue and green components in an unknown transparency by visual inspection. While test strips are available that will define a set of exposure parameters for a color print, they are both difficult to use and quite expensive. About the only satisfactory solution, therefore, is to employ some kind of color analyzer along with an exposure analyzer to arrive at the exposure parameters that must be followed if the resultant print is to faithfully reproduce the image on the transparency and, in turn, the original scene assuming the former faithfully depicts the latter. Unfortunately, the equipment presently available to the amateur photographer, in contrast to the commercial processor, for making full-color enlargements in the home is not all that good which probably explains the fact that even though a far greater percentage of color photographs are taken than black-and-white, of those who do their own processing, probably no more than a few percent are in color with the overwhelming majority being in black-and-white. While we are concerned here with only the analytical elements of color print-making systems, many of the same deficiencies that infect the whole field and make it unattractive to the amateur photographer are still present.

To begin with, for example, a well-designed and accurate color analyzer will likely cost as much as several hundred dollars on today's market and this is probably more than many amateurs have invested in their entire darkroom. While other less expensive color analyzers can be found, most, if not all, of them are incapable of delivering the precise information needed to produce an acceptable print. A great majority of such analyzers, irrespective of cost, are likely to be so complicated to use that few amateur photographers possess either the skill or patience to master them.

Accordingly, a tremendous need exists for an analytical device by means of which the exposure parameters of an unknown color transparency, both positive and negative, required to make a satisfactory positive print can be determined simply and accurately. Such a unit should be reasonably inexpensive consistent with good performance. If possible, it should integrate well with existing enlargers as this is probably the single most expensive unit in the amateur's darkroom and one that he would likely be reluctant to replace. Most of all, the analyzer must be one that requires no special training or skill to operate if it is to be acceptable to the photographic hobbyist.

It has now been found in accordance with the teaching of the instant invention that such an analyzer is, indeed, possible and, moreover, practical. The one forming the subject matter of the instant invention comprises an illumination level comparator, three filters for the latter and a diffuser that cooperate with one another and with both calibrated and uncalibrated light-flux attenuators to determine the exposure parameters for almost any unknown color transparency that are needed to make an acceptable print therefrom. In the preferred form of the invention, components present in existing photographic enlargers are employed as both the calibrated and the uncalibrated light-flux attenuators, the former function being fulfilled by the calibrated enlarger lens diaphragm while the latter is provided by the image magnification adjustment.

It is, therefore, the principal object of the present invention to provide a novel and improved analyzer for color transparencies.

A second objective of the within-described invention is the provision of a unique method of using the aforesaid apparatus to determine the exposure parameters for an unknown transparency necessary to produce an acceptable print therefrom.

Another object of the invention herein disclosed and claimed is to provide a combination color analyzer and overall exposure analyzer, both of which cooperate with calibrated and uncallibrated light-flux attenuators to adduce the exposure information necessary to produce an acceptable positive print from an unknown color transparency.

Still another objective of the invention is the provision of analytical apparatus for determining the color exposures that integrates with any photographic enlarger having two separate and independent ways of varying the level of illumination, one of which changes all components equally while the other is calibrated.

An additional object of the invention forming the subject matter hereof is to provide a color analyzer that functions equally well in analyzing positive or negative transparencies.

Further objects of the invention are to provide an exposure analyzer that is especially well-suited to the making of positive color prints by the additive method from color negatives and which is relatively inexpensive yet accurate, rugged, compact, sensitive, simple, lightweight, easy to use, fast, efficient, versatile and even decorative in appearance.

Figure 2:
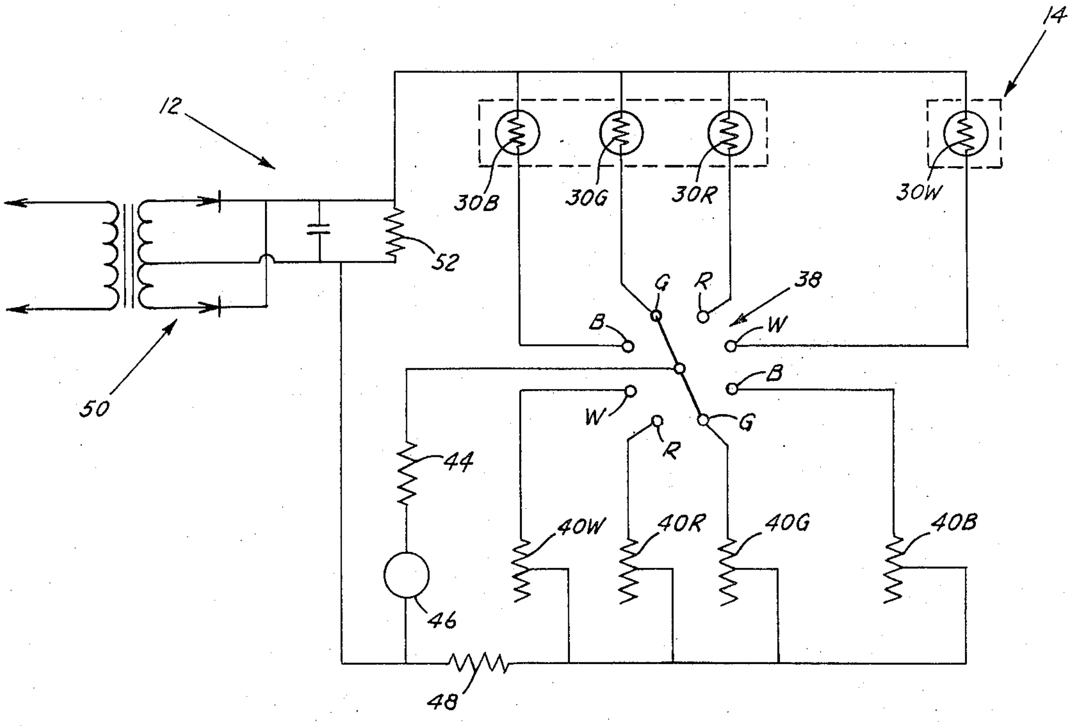

Other objects will be in part apparent and in part pointed out specifically hereinafter in connection with the description of the drawings that follows, and in which:

FIG. 1 is a schematic representation showing the color and exposure probes of the present invention in spatial relation to the diffuser, enlarger lens, source of illumination, and calibrated and uncalibrated light-flux attenuators; and FIG. 2 is a circuit diagram showing the electrical circuit for the analyzer.

A common class of positive color print-making materials has three emulsion layers, one of which is primarily sensitive to red light, a second to blue and the third to green. Each brand and type of such print-making materials responds somewhat differently to the light falling thereon and, in fact, there may be some differences from lot to lot of the same type. Bascially, however, each emulsion layer, regardless of the type, brand or lot of print paper, has a certain fixed quantity of light of a particular color or mixture thereof that must fall thereon before it will respond upon development to closely reproduce the colors present in any positive transparency to which it was exposed. Obviously, when a color negative is used in place of a positive, the colors in the print therefrom will, hopefully, faithfully represent the original scene rather than what appears on the negative, nevertheless, in both instances a certain quantity of light of a predetermined color or mixture thereof must reach the sensitized emulsion layers of the print before it will respond as the manufacturer intended it to. The sensitivities of the red, blue and green emulsion layers are not the same in a particular print paper nor is the layer responsive to a given color in one paper like that which is responsive to the same color in another paper, perhaps even one of the same brand and type but of a different lot although in the latter instance the differences should be slight.

One must also recognize that the total quantity of light or "exposure" of a given color is a product of two factors, namely, its level of illumination and its duration; however, the response of a particular emulsion layer is not uniform over a broad range of conditions that will produce the same overall exposure. For instance, short duration exposure at a high level of illumination will not, under some circumstances, produce the same response in a given emulsion layer as a long-duration exposure at a low-level of illumination even though the total exposure is identical. Furthermore, since each of the three emulsion layers responds somewhat differently over the range of time-level of illumination combinations, one should, if possible, stick within a relatively narrow range thereof to lessen the risk of so-called "reciprocity failure" where the color balance is completely off and, to a great extent, unpredictable. In general, high-level of illumination short-duration exposures of only a few seconds, are to be avoided as are the low-level of illumination long-duration ones of, perhaps, over a minute. Between these extremes, while some shift in a color balance will still occur, it probably won't be too severe and can, therefore, be compensated for rather easily in the next print by inspecting for minor color shifts in the preceding one.

In addition to the emulsion characteristics of the positive print-making material, the processor is faced with a myriad of other variables, all of which are going to have some effect on the finished print. Those we are concerned with here and over which we exert control all occur prior to processing the finished print and they include such things as the type of illumination used in making the exposure, the age and spectrum of the latter, the voltage, the type of projection system, and, of course, variables in the transparency itself.

As is true of almost all exposure analysis techniques, whether black-and-white or color, the starting point is the best possible print the processor is able to make by trial-and-error from a previously chosen standard transparency. The standard transparency itself should be chosen carefully with an eye to its overall color values, i.e., one that has a good range of colors with no one predominating. It can be either a positive transparency or a negative one although both the standard and unknown should be of the same type. In addition, what we shall refer to here as the "reference" or "standard" transparency should, preferably, be fairly representative of the subject matter that will be contained in the unknown transparencies that are to be compared thereto. For instance, one whose tastes run mostly to "scenics" would be ill-advised to adapt as a reference standard a transparency taken of a "still-life" under artificial light. Good highlight and shadow areas are, of course, essential also.

Now, the trial-and-error print made from the reference standard transparency is, obviously, going to involve a certain amount of subjective evaluation and also is dependent, to some extent at least, upon the equipment and skill of the processor. Accordingly, when the term "acceptable print" and equivalent language is used herein, it is not intended to define any absolute standard, but rather, that which the processor has chosen as exemplary of what he would be satisfied with as far as prints made from his unknown transparencies are concerned. His individual taste, for instance, may be such that other people find the color rendition not only untrue, but unpleasant; nevertheless, such a print is an "acceptable" or "satisfactory" print for standardization purposes as the term is used herein.

Having made this acceptable print by trial-and-error techniques from the previously-chosen standard transparency, one has, according to the assumptions made here, satisfied those rather precise requirements of the positive print-making material as to the total quantities of red, blue and green light necessary before the corresponding emulsion layers thereof respond to faithfully reproduce the colors in the original subject or the transparency if it be a positive, rather than a negative, one. The important thing is that we have determined by way of trial-and-error one set of exposure parameters that are known to satisfy the precise demands of the print-making material. Our ultimate objective is, of course, to determine a set of exposure parameters for any unknown transparency that will evoke an identical reponse in the print-making material and, in common with all other exposure determination systems, we do this by comparing what we know from the standard transparency and acceptable print made therefrom with what we known or can determine from the unknown transparency so that we can introduce appropriate corrections. The instant invention, therefore, relates to a novel apparatus for making such comparisons together with the unique procedure for using such apparatus to evolve the exposure parameters for any unknown transparency rather than those parameters themselves. As far as the latter are concerned, one of ordinary skill in the art can, without the exercise of invention, take the set of exposure parameters thus determined for the unknown transparency and translate them into whatever form that best suits a given print-making system.

The apparatus involved is simple and a good deal of it is already present in a conventional unit for making color prints and this, by the way, is one of the big advantages of the system forming the subject matter hereof. While certain supplementary equipment of a special nature is required, it is, likewise, simple, relatively inexpensive and quite easy to use. The technique of using the apparatus of the present invention to arrive at the exposure parameters for an unknown transparency is also quite unique.

A clear understanding of the exposure parameter determination techniques of the present invention can best be realized by first looking at the broader aspects of the system thus reserving until later a detailed analysis of the apparatus and method employed to implement same. In doing so, we will be pointing toward a set of exposure parameters for the unknown transparency expressed in terms of red, green and blue time intervals and a single light-flux attenuation setting in accordance with which the levels of illumination of all three color components are determined. The reason for expresssing the exposure parameters in these terms is an arbitrary one, namely, that these are the values we need to make a color print with the print-making apparatus forming the subject matter of my copending application Ser. No. 223,081, filed Feb. 2, 1972; however, as has already been pointed out, a simple conversion thereof will change the terms in which these parameters are expressed to those better suited for a print-making system predicated upon a different method.

We must begin by recognizing that a number of choices are open to us in terms of the trial-and-error method employed in making the print from the standard transparency from which the reference exposure parameters are determined and that we would be wise to choose one that provides exposure data in the form that is most useful in terms of what is to follow. For example, since we have elected to make the ultimate print from the unknown transparency in accordance with the additive method wherein the levels of illumination all three components are attenuated to the same degree for independently determined intervals, it would be rather foolish to make the trial-and-error print in accordance with the subtractive method where a constant time interval is used for all three components and the level of illumination of each color light is attenuated differently, even though it is entirely possible to translate the latter type of data into the former. Accordingly, we will open the discussion with the assumption that the standard transparency has been chosen but no trial-and-error print has yet been made therefrom.

Realizing that we are going to attenuate all three colors of light equally and vary the time intervals therefor, we will adopt this technique in making the trial-and-error print. We will start with one of the three colors and determine by trial-and-error a level of illumination and time interval therefor that will deliver the necessary quantity of such color light to the corresponding sensitized emulsion layer of the print-making material. In so doing we will have attenuated the light to some known degree by means of a calibrated light-flux attenuator forming a part of the exposure determination apparatus of the present invention. Secondly, a similar determination will be made for one of the remaining colors, however, in this instance, we will attenuate it to the same degree as the first and vary only the time interval, once again by trial-and-error. Finally, the exact same procedure will be followed for the third and last of the three colors using the same degree of light attenuation as the first two while adjusting only the exposure interval. Once a satisfactory print has been made by the above procedure, we will have established one set of red, blue and green time intervals which, when coupled with a known constant degree of light-flux attenuation, will evoke the necessary response in the emulsion layers of the print-making material.

Our ultimate goal is going to be that of attenuating the levels of illumination of all three primary components of light transmitted by the unknown transparency to the same degree and determining the time intervals corresponding thereto that will result in the same quality of each color light striking the surface of the print-making material which reached same when the satisfactory print was made from the standard transparency. In order to do this, we have chosen to establish a set of reference levels of illumination for the three light components transmitted by the standard transparency with which we can compare the levels of illumination of like components transmitted by the unknown transparency. Now, once these reference levels have been established, we are in a position to make some meaningful comparisons with the levels of illumination of the like components of light transmitted by the unknown transparency and it is these comparisons and the manner of making same that constitute the true novelty of the instant invention.

As previously mentioned, we have a total of four variables for which we must determine values in order to define a set of exposure parameters for the unknown transparency, namely, a red time interval, a blue time interval, a green time interval and a degree of light attenuation applicable to all these components equally which will produce component illumination levels which, during the aforesaid time intervals, will result in the same quantity of light of each color reaching the emulsion layers of the print-making material as reached a sheet of like material from the standard transparency while making the acceptable print therefrom by trial-and-error. Of these four variables it is possible to establish a fixed value for any one of the four because there will be corresponding fixed values for the other three that correspond thereto. In accordance with the teaching of the instant invention, one of the three time intervals will be chosen to have a fixed value in preference to predetermining a fixed degree of light-flux attenuation for all three components. It remains, therefore, to select one of the three component time intervals to hold constant and it really doesn't make any difference which one we select in terms of determining the exposure parameters for unknown transparency although there may be certain practical considerations that favor one over the other in the actual print-making operation. Whichever one of the three we elect to hold constant, the value given thereto should bear some known relation to the corresponding value determined for the standard transparency while making an acceptable print therefrom. By far the simplest and most logical value to choose is, of course, the exact same time interval determined by trial-and-error for the corresponding component of the standard transparency.

Now comes an important step in the procedure which deserves a bit of extra attention. We can, theoretically at least, stick with the same calibrated light attenuator setting that we used to evoke the satisfactory response in the emulsion layers of the positive print-making material while making the trial-and-error print therefrom;

however, to do so has certain serious and very practical drawbacks. To begin with, the use of even a modest degree of image magnification to make the trial-and-error print is going to result in a level of illumination that is, at the very best, a small fraction of what it could be. In other words, since the level of illumination varies inversely with the square of the distance from the light source, it doesn't require much in the way of image magnification before the level of illumination in the plane where the print is to be made has decreased as much as ten to a hundred-fold below the possible maximum. This, in and of itself wouldn't be too serious if it were not for the fact that we must be able to detect and measure relatively small variations in these already dim levels of illumination. This task can, and is, being accomplished quite effectively by such apparatus as photomultiplier tubes and the like, but such equipment is expensive and it also requires a suitable power supply which further increases the cost. If, on the other hand, we were able to operate our illumination-level comparison-measuring apparatus at nearly the maximum levels of illumination available in a photographic enlarger, we could, perhaps, substitute less expensive components such as, for example, simple cadmium sulfide photoresistors that cost somewhere around 50 cents each.

Fortunately, the relative levels of illumination of the three components remain exactly the same irrespective of the degree of image magnification or the extent to which the light has been attenuated as it passes through the iris diaphragm or some other attenuator in the path of the light beam. We can, therefore, calibrate the illumination-level comparison measuring apparatus to levels of illumintion that approach the maximum attainable with a given enlarging system without any adverse effect upon the exposure determination procedure so as to realize the considerable advantage of inexpensive equipment. Our choice of a reference illumination level for calibration purposes should be selected with the thought in mind of leaving just barely enough latitude to accommodate unknown transparencies that are denser than the standard by a factor sufficient to cover nearly all of those that will likely be printed. In other words, if we select a degree of image magnification and light-flux attenuation such that we retain the ability to match the levels of illumination of like components transmitted by the unknown and the standard transparencies even though the former is denser by a factor of two or three times than the latter, we should, nevertheless, have left plenty of latitude in the system to accommodate nearly any transparency from which an acceptable print can be made while, at the same time, nearly maximizing the level of illumination so that even minor differences therein are readily measured by inexpensive detectors.

Thus, instead of setting the calibrated light-flux attenuator to the same setting it had while making the acceptable print from the standard transparency, we set it at some arbitrarily-selected point at which we approach the maximum level of illumination attainable with the available equipment while leaving room to accommodate somewhat denser unknown transparencies. It will be remembered that this calibrated light-flux attenuator was used to attenuate all three components of light transmitted by the standard transparency equally while making the satisfactory print therefrom by trial-and-error and it will be employed to perform this self-same function in determining the exposure parameters for the print to be made from the unknown transparency at the arbitrarily-selected level of illumination. The particular form of this calibrated light-flux attenuator is of no importance as far as the functional considerations of the instant exposure determination system are concerned although, as will appear presently, there are several very practical considerations that favor one particular type of calibrated light-flux attenuator over another.

Next comes one of the most important steps in the entire exposure determination technique, namely, the use of a second uncalibrated light-flux attenuator in combination with the illumination level comparison measuring device to validate the first calibrated light-flux attenuator and, in so doing, define a set of exposure parameters for the chosen component of the unknown transparency that will evoke the identical response in the appropriate emulsion layer of the print-making material as occurred when making the acceptable print with the standard transparency. Remember, we are at a point in the procedure where we have chosen a time interval for one of the three components of the unknown transparency that is the same as that used for the like component of the standard transparency when making the acceptable print therefrom and we have also set the calibrated light-flux attenuator to the same arbitrarily-chosen near maximum setting adapted for calibration purposes. The unknown, therefore, is by what degree, if any, does the level of illumination of the chosen component transmitted by the unknown transparency differ from that of the standard. In accordance with the teaching found herein, we don't attempt to measure or otherwise define this difference, but instead, we merely measure the level of illumination of said component transmitted by the standard transparency for use as a reference for comparison purposes and then employ our uncalibrated light-flux attenuator to vary the level of intensity of the chosen component transmitted by the unknown transparency until it exactly equals that of the standard as determined by the same illumination level comparison measuring device. By thus equating these levels of illumination and having already equated the time intervals, we have, at last, established a base for the unknown transparency from which we can rather easily determine the exposure parameters for the remaining two components thereof.

Once we are at this point, the rest is fairly simple even though we still have three unknowns yet to be determined, namely, the time intervals for the remaining two components and the final degree of light flux attenuation applicable to all three components equally. The uncalibrated light-flux attenuator is left set at the degree of light-flux attenuation it had when validating the calibrated one by making its scale read correctly. When we used the calibrated light-flux attenuator to make the trial-and-error print from the standard transparency, it established a common degree of light-flux attenuation for all three components which, when coupled with a certain degree of image magnification, produced an acceptable tonal response. From here on, it will be employed a good deal differently as it will be used mainly as the means for determining to what extent, if any, the level of illumination of the remaining two components transmitted by the unknown transparency differ from the corresponding components of the standard.

In making this determination we, once again, use the illumination level comparison measuring device; however, instead of its being used in combination with the uncalibrated light-flux attenuator, it will be used with the calibrated one. Now, as before, no attempt will be made to use the illumination level comparator as the means for making a quantitative determination of the degree to which the level of illumination of one of the remaining components of the unknown transparency differs from that of the like component in the standard, but instead, it will be employed merely as a comparison measuring instrument capable of equating the like component illumination levels. On the other hand, the calibrated light-flux attenuator will be used to determine the extent to which the levels of illumination vary as well as how to compensate for any differences therebetween.

When we made the satisfactory print from the standard transparency by trial-and-error, we found a level of illumination and time interval for each component that would evoke the desired response in the appropriate emulsion layer of the print-making material. While we are using different, and presumably more intense, levels of illumination for each of the three components as the reference standards against which we compare the corresponding components of the unknown transparency, the like components have had their levels of illumination changed (increased) equally and, therefore, the detectable differences in levels of illumination are exactly the same at the arbitrarily-chosen near maximum level as they would have been had we stayed with the degree of light-flux attenuation used to make the satisfactory trial-and-error print. Accordingly, since we have used these arbitrarily-chosen near maximum levels of illumination for the components transmitted by the standard transparency as the reference levels for calibration purposes, one need only match the levels of illumintion of the remaining two components of the unknown transparency to these reference levels by means of the calibrated light-flux attenuator to define the differences, if any, in magnitude therebetween.

At this point, we have gained two additional pieces of information from which we can determine appropriate corrected values for the unknown transparency. Since we now know the magnitude of the differences, if any, between the levels of illumination in like components transmitted by the standard and unknown transparencies, we also know, or at least can readily determine, what corrections in time intervals must be made to compensate therefor. In other words, while we still don't know what degree of light-flux attenuation to use in exposing the final print assuming, as will usually be the case, that we elect to choose different degrees of image magnification and light-flux attenuation from those used in exposing the trial-and-error print from the standard, we do know values for three of the four unknowns, namely, all three component exposure times.

One more thing needs to be done before we can make a satisfactory print from the unknown transparency and that is the determination of a degree of light-flux attenuation applicable to all three components equally which, when coupled with the previously-determined exposure times, will evoke the selfsame response in the print-making material as was produced therein when making the satisfactory trial-and-error print from the standard transparency. Fortunately, since changing the degree of image magnification affects the levels of illumination of all three components equally, our task becomes a simple one. We merely use some type of illumination level comparison measuring device to establish a reference level of illumination of white light known to produce the desired tonal response in the finished print and use the calibrated light-flux attenuator to establish this same level of white light illumination for the print to be made from the unknown transparency without regard to the degree of image magnification. The latter determination is a common one in the photographic arts and it does not, therefore, constitute a novel feature of the instant exposure determination method. In fact, while the illumination level comparison measuring apparatus used to match the levels of illumination of like color components transmitted by the standard and unknown transparencies can be and is used for matching the white light illumination levels in comparable shadow areas of the projected images from the standard and unknown transparencies as will appear presently, this isn't necessary and many other types and styles of commercially-available exposure determination devices including those used for black-and-white photography will work quite satisfactorily to establish the final setting for the calibrated light-flux attenuator at the chosen degree of image magnification.

Referring next to the drawings for a detailed description of the present invention and, initially, to FIG. 1 for this purpose, reference numeral 10 has been chosen to broadly designate the analyzer of the present invention which comprises an illumination level comparator 12 having a spot-comparison probe 14 as a part thereof, an uncalibrated light-flux attenuator 16, a calibrated light-flux attenuator means 18, and a diffusion filter 20. In addition, reference numeral 22 designates a negative carrier with a transparency 24 therein, numeral 26 the enlarger lamp and number 28 the lens for the latter.

Uncalibrated light-flux attenuator 16 is represented schematically in FIG. 1 and, in the particular form shown, it comprises the mechanism for varying the degree of image-magnification by changing the spacing between the lens and baseboard (not shown) where the print will be made. Actuation of this adjustment varies the levels of illumination of the red, blue and green components of the projected image equally and this is the sole requirement of the uncalibrated light-flux attenuator because, as already mentioned, it is only used as a part of the analyzer to validate the scale of the calibrated light-flux attenuator 18. Knowing this, it becomes readily apparent that other types of attenuators capable of attenuating all three components equally could be substituted for the magnification control without the exercise of invention and without adversely affecting its function in the analyzer. Examples of alternative attenuators would be such commercially-available accessories as variable-density step-wedges, variable-density continuous-wedges, or a pair of polarizers mounted on atop the other for relative rotational movement. Most variable-density wedges attenuate all three primary light components equally over their entire range, however, not all polarizers do so and, since this is a requirement of both the uncalibrated as well as the calibrated attenuator, one must be careful to select polarizers having this property. For practical rather than functional reasons, the image-magnification control is preferred over other uncalibrated attenuators for the simple reason that it is already present in the conventional photographic enlarger and needn't, therefore, be added to the analyzer as a separate piece of equipment.

The calibrated light-flux attenuator 18 is, likewise, an integral part of most photographic enlargers as it comprises, in the particular form illustrated, the adjustable iris diaphragm that forms a part of the enlarger lens 28. Its *f*-stop scale reads directly in increments of light attenuation which are readily convertible to time interval corrections. Alternatively, a supplemental scale in which this conversion has already been made can be added as will appear presently. Here again, while the adjustable iris diaphragm of the enlarger lens together with the scale or scales associated therewith constitute the preferred form of the calibrated light-flux attenuator because they already are available as an integral part of most photographic enlargers, other well known calibrated attenuators will work just as well from a functional standpoint. The previously-mentioned variable-density step wedge, for example, will do nicely and its steps ordinarily bear a logarithmic relation to one another such that adjacent steps increase or decrease the light flux by a constant ratio. Relatively rotatable polarizers can easily be calibrated in the same way.

The illumination level comparator 12 of the analyzer includes, in the particular forms shown in FIGS. 1 and 2, a total of four photo-resistors 30B, 30G, 30R and 30W, the latter comprising the unfiltered one in the spot-comparison probe 14. While many types of light-responsive detectors can be used in the illumination level comparison measuring device, simple cadmium sulfide photo-resistors whose resistance increases as the level of illumination decreases are preferred because of their commercial availability and low cost. Actually, all four resistors can be identical, the letters used therewith merely identifying the one covered by the blue, green and red filters 32, 34 and 36, respectively, while the last one 30W, designates the uncovered one used to take the white light illumination level reading at a selected point on the projected image. These filters cooperate with the diffuser 20 to admit light of only one color to the photo-resistor therebeneath mixed in such a fashion that a reasonably valid measure of the level of illumination of light of that color transmitted by the transparency can be obtained.

The illumination level comparator 12 of the analyzer including the spot-comparison probe 14 are most clearly revealed in FIG. 2 to which reference will now be made. The particular illumination level comparator illustrated has a selector switch 38 with paired sets of contacts B—B, G—G, R—R, and W—W. The function of the switch arm is, of course, to selectively interconnect one pair of contacts while disconnecting the other pairs, there being only one active pair at a time.

Each pair of contacts, in turn, completes a circuit through branches of a voltage divider circuit, each branch of which contains one of the photo-resistors 30B, 30G, 30R or 30W along with a corresponding variable resistor 40B, 40G, 40R and 40W as shown. The center tap 42 of switch 38 connects through current-limiting resistor 44 to indicating means 46 which, in the particular form shown, comprises a gas-discharge lamp capable of defining a clear point of extinction. A current-limiting resistor 48 is shown in series with the variable resistors to limit the current load through the lamp should the variable resistors be reduced to zero.

Switch 42 functions to divide the circuit into upper and lower halves, the upper half of which includes the several photo-resistors, each of which defines a measuring loop with the current-limiting resistor 44 and indicator 46. The lower half, on the other hand, includes the variable resistors, each of which also cooperate with resistor 44 and indicator 46 to define separate calibration loops. All of the four photo-resistors are preferably of a type exhibiting a rather broad spectral response. The variable resistors, on the other hand, preferably exhibit approximately a logarithmic curve of resistance vs. rotation such that, for example, 50,000 ohms appears between the terminals at 50 percent rotation and 500,000 ohms at 100 percent. Photo-resistors and variable resistors having the above-recited characteristics are readily available commercially.

While either an A.C. or D.C. power supply can be used, the particular power supply 50 shown in the drawings is a conventional full-wave rectifier adapted to generate a D.C. voltage and which includes a bleeder resistor 52 capable of drawing relatively heavy current connected thereacross for the purpose of limiting the change in voltage brought about by variations in load imposed by the measuring and calibration loops at various intensity levels. By way of example, a 200V. D.C. power supply will typically show a voltage variation of less than 1 percent when a 2,000 ohm bleeder resistor 52 is included therein.

It is important to note that while the comparator circuit illustrated has a selector switch capable of selectively actuating anyone of four identical voltage-divider circuits, exactly the same thing could be accomplished with one, or at most two, such circuits by changing the filters or removing same altogether and recording the settings of the variable resistor under the four sets of comparison conditions; however, in so doing one would bring about a certain degree of circuit simplification at the expense of a significantly more complicated analysis procedure. Thus, the preferred circuit is the one illustrated in which the red, green, blue and white light variable resistors can be calibrated and left alone until such time as the conditions change to an extent where recalibration becomes necessary or desirable. Between these extremes is a third possibility which, while less practical than the preferred embodiment illustrated, is a great deal better than the one using a single variable resistor. It, as might be expected, retains the variable resistors so the settings thereof needn't be changed fro reading to reading, however, a single photo-resistor with interchangeable filters is selectively connected thereto. Actually, the movement of the selector switch can accomplish the change in filters. With inexpensive photo-resistors, it is probably less expensive to use one with each variable resistor than to construct a filter-changing mechanism. On the other hand, three or four photo-multiplier tubes become quite expensive and in instances where they are used to measure the levels of illumination it might well be more economical to use just one and a suitable filter-changing mechanism. from In operation, when the voltage across the calibration loop reaches the firing potential of bulb 46, it will turn on and, conversely, if the voltage across the latter falls to its extinguishing voltage, it will turn off. Thus, at any particular setting of the selector switch and of the variable resistors, there will be corresponding values of the photo-resistor paired therewith that will produce a voltage in the calibration loop that will cause the indicator bulb to extinguish. Accordingly, the analyzer circuit of FIG. 2 can be set to cause a repeatable indication to occur at preset levels of illumination of red, blue, green and white light reaching the chosen photo-resistor of the illumination level comparator.

From the above it should be apparent that the comparator in combination with the enlarger lamp and either uncalibrated light-flux attenuator 16 or calibrated light-flux attenuator 18 provide the means by which a given level of illumination of light, colored or otherwise, can be reproduced. Once this becomes possible and we know the conditions under which it occurred, the next step is to compare it with like information derived from a standard so that the degree to which the unknown deviates from the norm can be ascertained. Finally, having determined the extent of the deviation, if any, we can hopefully introduce appropriate corrections that will equate the unknown to the standard.

Having learned the construction and operation of the comparator 12, it will be helpful to go through the entire procedure again in more detail to see just how the analyzer and method of using same implements the general criteria of the exposure determination system previously set forth. We can assume that the proper transparency has been selected as we did before, however, a bit more should be said about making the acceptable trial-and-error print therefrom. As noted before, significant reciprocity failure is likely to occur at either very short or overlong exposure times, therefore, it is wise to select one somewhere in between. Choosing an exposure time for one of the color components that we suspect may take one of the longer intervals of somewhere between, say, 20–40 seconds has certain practical advantages. For instance, if one or both of the other components require a shorter exposure time, it will still be sufficiently long to stay well above that time at which serious reciprocity failure occurs. On the high side, if the like component in the unknown transparency is twice as dense as that of the standard, we can safely double its exposure time and still not exceed the reciprocity limits by much, if any. Also, if we happen to have chosen a component which, in fact, does not end up requiring the longest of the three exposures, there is plenty of room left for a longer one.

Even though red light predominates in most incandescent light sources, the red-sensitive emulsion layer in all but a few positive print-making materials is the least sensitive of the three, therefore, a logical choice is a 30 second red exposure for the standard transparency although, as we have already seen, such a choice is made for purely practical reasons and not because it is essential to the exposure determination technique herein disclosed. To illustrate the fact that it makes no difference which one we choose, the discussion that follows will be based upon the assumption that a 20 second green exposure time was used for the trial-and-error print and that it is being chosen as the one to hold constant instead of the red. Having made this choice we need only attenuate the green component of light transmitted by the unknown transparency until it evokes the proper response in the green-sensitive emulsion layer when exposed thereto for 20 seconds. Ordinarily, this will be done by actuating the calibrated light-flux attenuating means or, in this instance, the enlarging lens iris diaphragm, in preference to the uncalibrated attenuator assuming we are changing the degree of image magnification to accomplish the latter. Be that as it may, both types of attenuators would work to perform this function regardless of their specific construction.

Next, having produced the desired response in the green-sensitive emulsion layer at a 20 second green light exposure, we can proceed to determine corresponding exposure times for the blue and red components under the same conditions of image-magnification and iris setting by trial-and-error. We will assume for purposes of the present discussion that a satisfactory response in the blue-emulsion layer was obtained with a blue exposure interval of 10 seconds and the same satisfactory response was obtained in the red-emulsion layer at 25 seconds showing our guess was correct when we suspected the red time interval might be the longest of the three.

One more determination needs to be made with respect to the print produced from the standard transparency, namely, the level of illumination of white light falling on the deepest of the shadow areas in which we want to preserve detail. Such a determination is made with the spot-comparison probe 14 exactly the same way it is done in black-and-white photography. In fact, it is not essential that one use probe 14 for this purpose as the reading obtained therefrom is independent of the color component readings and can, for this reason, be made separately with other well-known comparison densitometers and the like. A shadow area is chosen because it is likely to be relatively independent of color.

With the production of a satisfactory print by trail-and-error, we have arrived at a set of exposure parameters which we could introduce into the analyzer 10 for comparison purposes, however, as we have seen already, the levels of illumination are likely to be way too small for simple inexpensive cadmium sulfide photo-resistors to detect small differences in relative magnitude accurately. Thus, instead of leaving everything just as it was while making the print, namely, the same degree of image magnification and the same iris setting for the enlarging lens diaphragm, we will arbitrarily select a different degree of image magnification and light-flux attenuation capable of nearly maximizing the component levels of illumination for calibration purposes. Rather than project a full-color focused image we must also move the diffuser 20 into place so that we can take integrated color readings. We do this by actuating selector switch 38 and independently setting variable resistors 40 until the point of extinction of lamp 46 is reached for each level of illumination of light falling on the corresponding photo-resistor 30. For instance, with the selector switch 38 actuated as shown to energize the "GREEN" voltage-divider circuit, photo-resistor 30G is responding to the level of illumination of the green light falling thereon through green filter 34 and variable resistor 40G will be adjusted to the point of extinction of lamp 46. Once this has been done, the GREEN voltage-divider circuit of the comparator is set to provide a repeatable indication any time green light at the same level of illumination falls on resistor 30G. The other filter-covered photo-resistors 30B and 30R will, of course, respond in the same way once their companion variable resistors have been set. Photo-resistor 30W, on the other hand, responds to the same level of illumination of white light as fell upon the chosen point in the projected image from the standard transparency when making the acceptable print. Note, here, that while the level of illumination is considerably dimmer than that at which the levels of illumination of the components are equated, we are concerned only with a match in absolute levels of illumination rather than small differences therebetween.

The next step in the procedure is to substitute the known transparency for the standard one and proceed with a determination of its exposure parameters. We start with the diffuser in place to give integrated illumination level readings of the red, blue and green components transmitted by the unknown transparency. Of the four unknown, we are going to arbitrarily select a fixed value for one of them and, in accordance with the criteria outlined previously, we will let it be the same 20 second green time interval as was used in making the print from the standard transparency.

Now comes one of the most significant steps in the whole analysis procedure, namely, that of setting the calibrated light-flux attenuator to the same arbitrarily-chosen point on its scale it was set at while calibrating the light-intensity comparator and validating this calibrated attenuator setting by means of the uncalibrated attenuator. In other words, merely setting the calibrated attenuator to the arbitrarily chosen setting adapted for calibration purposes will not equate the levels of illumination of the green components in the standard and unknown transparencies unless they happen to already have equal integrated densities which will seldom, if ever, be true. Accordingly, we make this condition occur by adjusting the uncalibrated light-flux attenuator 16 until the reference level of illumination for the green component from the standard transparency against which the comparator was calibrated is matched by the green component from the unknown transparency. More specifically, we accomplish the foregoing by simply using the uncalibrated light-flux attenuator in combination with the comparator 12 to equate the levels of illumination of green light falling on photo-resistor 30G to that which reached the latter from the standard transparency under the arbitrarily-chosen conditions which were adopted as a basis for calibrating the green voltage-divider circuit. Note here that the particular scale value on the calibrated light-flux attenuator is of no significance so long as we can be sure it is the same as was adopted for calibration purposes because all this scale is doing for us at this point is making it possible to reproduce accurately a predetermined degree of green light flux without regard to its numerical value.

Now, having used the uncalibrated attenuator to change the levels of illumination of all three components equally until the level of the green component matched the reference level therefor, we will temporarily maintain this condition while we use the calibrated attenuator in a way to determine the extent to which the levels of illumination of the red and blue components from the unknown transparency differ from the reference levels against which the comparator was calibrated.

To find the exposure interval applicable to the blue component, we actuate selector switch 38 onto the B—B contacts and vary the settings of the calibrated light attenuator until the point of extinction of lamp 46 is reached thus signifying that the level of illumination of blue light falling in photo-resistor 30B is exactly equal to the reference level of blue light from the standard transparency against which the comparator was calibrated. At this point, the scale on the calibrated attenuator becomes significant because it must tell us to what extent the time interval for the blue component of the unknown transparency must be raised above 10 seconds or reduced below this value to maintain the same relative color balance in the unknown transparency as exists in the standard one. Thus, if we had to move the calibrated light attenuator from scale position "X" to scale position "Y" in order to equate the blue light illumination levels, the difference between X and Y must be translatable into a known degree of light attenuation or directly to a different exposure interval. If, for example, the difference between X and Y was known to represent a degree of attenuation of the blue component whereby only half the blue light was allowed to reach photo-resistor 30B, then we also know that the illumination level of the blue component of the unknown transparency was twice as bright as the blue component of the standard transparency. We also know, of course, that the total quantity of light reaching a given point is the product of its level of illumination and the time interval during which it shines, therefore, if we double the level of illumination we must cut the time in half. Accordingly, in order to preserve the same relative levels of illumination we must cut the 10 second time interval in half and expose the blue component of unknown transparency for only 5 seconds while exposing the green for the full 20 seconds.

The same exact procedure is followed with respect to the red component of the unknown transparency to determine the time interval correction necessary to compensate for the difference in the illumination levels of the red light transmitted by the unknown and standard transparencies. For example, such an analysis by the calibrated light attenuator with the switch of the comparator 12 located on contacts R—R might well indicate that the red light from the unknown transparency was dimmer than that of the standard by some determinable factor such that it would be necessary to increase the exposure time from 25 up to 32 seconds.

Upon completion of this sequence of operations, we now have arrived at three exposure intervals for the unknown transparency which will reproduce the same relative color balance found in the same colors from the standard transparency. We still don't known, however, the degree to which all three components of light from the unknown transparency will have to be attenuated in order to evoke the self-same response in the print-making material during the intervals now known and at the degree of image magnification chosen for the final print as were adduced therefrom while making the trial-and-error print from the standard transparency. To do this, we must first remove the diffuser from the light path and raise or lower the enlarger as necessary to produce a focused full-color image of the subject matter depicted in the unknown transparency in the plane where we will eventually place the print-making material. As we do so it is significant to remember that we are attenuating all three color components equally just as we did earlier with the uncalibrated attenuator 16, in fact, as already mentioned, we can use the raising and lowering of the enlarger head relative to the baseboard as our uncalibrated attenuator if we wish to do so. Once the image has been focused, we switch selector switch 38 onto contacts W—W and place photoresistor 30W in the spot-comparison probe 14 at a point on the projected image comparable to that spot on the focused full-color image from the standard transparency that was used to calibrate the white-light voltage-divider circuitr means of variable resistor 40W. In other words, we will follow the technique used before and select a shadow area of the projected image where we wish to preserve detail. Having positioned probe 14, we make the final light attenuation by means of the calibrated light attenuator necessary to equate the levels of illumination of the white light falling upon the chosen spots in the projected full-color focused images from the standard and unknown transparencies, but, in so doing, we operate the calibrated light attenuator in an uncalibrated mode, i.e., without reference to its scale. As we do this, we have changed the value of the one variable in the original four that was common to all three components, i.e., the degree of light attenuation, to compensate for the chosen degree of image magnification to be used in the final print. In other words, while we already knew the time intervals for all three color components of the unknown transparency required to duplicate the color balance in the standard one, we did not know until now the degree of light attenuation common to all three components at the chosen degree of image magnification that will evoke the required response in the emulsion layers of the print-making material. The final exposure of the positive print-making material from the image transmitted by the unknown transparency will, therefore, be made at a blue exposure time of 5 seconds, a red exposure time of 32 seconds, a green exposure time of 20 seconds and a common degree of light attenuation corresponding to the setting of the calibrated light attenuator of the point where the illumination level of the white light falling on the chosen spot of the projected image from the unknown transparency equalled that falling on the spot in the projected image from the standard transparency chosen as a reference standard for calibrating resistor 40W.

For the third and last time, we are going over the procedure once more in a slightly abbreviated form as it would be conducted were we to use the elevation control of the enlarger head as our uncalibrated light-flux attenuating means and the adjustable iris diaphragm of the enlarger lens as the calibrated one.

In making the trial-and-error print from the standard transparency, we arbitrarily select one of the component exposure times as we did before and find by trial-and-error an *f*-stop setting that corresponds thereto and will evoke a satisfactory response in the emulsion layer of the chosen color component. Then, without changing this *f*-stop the time intervals for the other two components can also be arrived at by trial-and-error.

Now, of the four values thus determined by trial-and-error in order to make the satisfactory print from the standard transparency, as far as the color balance is concerned, we are interested in only three and they are the component exposure times. The overall level of illumination is significant but only insofar as it determines the tonal range of the finished print as opposed to the relationship between the colors. Accordingly, since we have just finished making an acceptable print from the standard transparency we have, at the same time, arrived at an overall level of illumination that will produce the desired tonal response. Before we disturb the set-up used to make the print, it is a good idea to calibrate our comparator so that we can reproduce an overall illumination level corresponding to that which produced a satisfactory print from the standard transparency. To do this, we set the selector switch 38 on contacts W—W and activate the white-light loop of the analyzer. Probe 14 will then be placed upon a shadow area in the full-color focused image from the standard transparency from which the satisfactory print was made and resistor 40W adjusted to the point of lamp extinction.

From this point on, we have no further need for the data concerning the *f*-stop and degree of image magnification employed in making the satisfactory print from the standard transparency by trial-and-error as we will be going to an entirely different degree of image magnification when we make our print from the unknown transparency and this data, therefore, is no longer needed.

As we know, the comparison in relative levels of illumination of like components is independent of the overall level of illumination. In other words, the level of illumination of the red component from the unknown transparency can be compared with that of the red component from the standard just as well at a bright level of illumination as it can at a dim one provided, of course, that both levels have been increased the same amount. Thus, if we are to take advantage of the opportunity to use inexpensive light-sensitive elements in our comparator, we would be wise to maximize our level of illumination consistent with leaving enough latitude to accommodate unknown transparencies that are a good deal denser than the standard one.

We do this by opening up the calibrated light-flux attenuator which in the preferred form of the invention constitutes the adjustable iris diaphragm of the enlarger lens to near its maximum aperture while, at the same time, decreasing the degree of image magnification to a considerable degree. For instance, let's assume our enlarger lens has a maximum aperture of, say, *f*–4.0. We shouldn't set the iris at this aperture and move the enlarger all the way down to the baseboard for calibration purposes, however, because, if we do, no latitude remains for accommodating a denser unknown transparency. One full *f*-stop latitude will be enough, obviously, to take care of an unknown transparency that is twice as dense in a particular color component or overall as the standard and this will usually be sufficient to cover any printable transparency. If not, one can easily provide greater latitude; but remember, we must also leave some room to adjust the uncalibrated attenuator in case the chosen component of the unknown transparency happens to be denser than the standard.

There are several techniques that can be used to arrive at a setting for calibration purposes that will provide for the denser transparency, one of the simplest being to close down the iris two full stops from its maximum, say from *f*–4.0 to *f*–8.0 and calibrate to this level of illumination with the enlarger head all the way down to the baseboard. Then, by opening up the lens from *f*–8.0 to *f*–5.6 and raising the head until the same level of illumination is achieved as indicated by the illumination level comparator, we have made provision for doubling the level of illumination of the chosen component (green) by lowering the head and, in addition, doing the same thing with the lens diaphragm in case either the red or blue components of the unknown transparency happen to be denser than the corresponding components of the standard. Actually, once we have determined this calibration setting, we can return to it without having to use the comparator at all. Obviously, there is no problem connected with resetting the iris diaphragm to ƒ-5.6 and if we have marked the enlarger column with an index mark indicating a point at which we can set the enlarger head and leave room for lowering the latter the distance necessary to double the green light intensity to accommodate an unknown transparency with a dense green component, we needn't resort to the comparator for this purpose.

Now, it is interesting to note here that this ƒ-stop setting for calibration purposes corresponds to our arbitrarily-chosen exposure time and it will remain so until, for some reason, we find it necessary or desirable to change. For instance, we are going to calibrate the comparator to a 20 second green exposure with the calibrated attenuator one stop short of wide open and the uncalibrated attenuator at a setting such that we can still double the level of illumination of the chosen component without exceeding the mechanical limits of the system. As previously noted, we might just as well have chosen a 25 second red exposure at ƒ-5.6, etc. as our standard but we didn't, and, therefore, there is no reason to change unless the characteristics of the print-making materials are improved to a degree where standardizing on something like a 10 second green interval is preferable to a 20 second one. The ƒ-stop scale on the iris diaphragm adjusting ring can, in fact, be supplemented with a second scale reading directly in exposure times as shown below:

| | | | | | | | | | | | | | |
|---|---|---|---|---|---|---|---|---|---|---|---|---|---|
| Seconds: | 2.5 | 3.2 | 4 | 5 | 6.3 | 8 | 10 | 12.5 | 16 | 20 | 25 | 32 | 40 |
| ƒ number: | 16 | | | 11 | | | 8 | | | 5.6 | | | 4 |

Had we wanted to leave two full ƒ-stops latitude to accommodate dense transparencies, the scale would look like this:

| | | | | | | | | | | | | | |
|---|---|---|---|---|---|---|---|---|---|---|---|---|---|
| Seconds: | 5 | 6.3 | 8 | 10 | 12.5 | 16 | 20 | 25 | 32 | 40 | 50 | 64 | 80 |
| ƒ number: | 16 | | | 11 | | | 8 | | | 5.6 | | | 4 |

Alternatively, had we elected to standardize on, say, a 25 second red exposure with one ƒ-stop latitude and a maximum aperture setting of ƒ-4.0, our scale would be as follows:

| | | | | | | | | | | | | | | | | |
|---|---|---|---|---|---|---|---|---|---|---|---|---|---|---|---|---|
| Seconds: | 1.6 | 2 | 2.5 | 3.2 | 4 | 5 | 6.3 | 8 | 10 | 12.5 | 16 | 20 | 25 | 32 | 40 | 50 |
| ƒ number: | 3 | | | 16 | | | 11 | | | 8 | | | 5.6 | | | 4 |

Obviously, from the above, it is apparent that one can shift either scale right or left relative to the other without changing the relationship therebetween.

Since the enlarger lens is already equipped with an ƒ-stop scale and not the time scale, probably the simplest approach is to place an ƒ-stop scale on the timer dials supplemented by a time scale as shown above. If, perchance, the advent of a new print-making material rendered the matching scales inappropriate, one need only supply the user with another set of overlay scales to use on his timer dials.

As far as the actual apparatus is concerned, rather than supplementing the ƒ-stop scale with a time scale in the manner indicated previously, it has been supplemented with an arbitrarily-selected set of symbols that are also present on the timer dials, thus:

| | | | | | | | | | | | | | | | | | |
|---|---|---|---|---|---|---|---|---|---|---|---|---|---|---|---|---|---|
| Time: | A | B | C | D | E | F | G | H | I | J | K | L | M | N | O | P | Q |
| ƒ number: | 16 | | | | 11 | | | | 8 | | | | 5.6 | | | | 4 |

Note that the intervals are reduced to ¼ ƒ-stops instead of the thirds described previously. Ordinarily the user has no need to know the particular time intervals that correspond to the letter os the arbitrarily-selected symbols of the time scale but a translation thereof can easily be supplied if needed. After all, the user need only match the letter on the time scale of the diaphragm ring to that of the scale on the timer dial and he needn't known any values.

In any event, we are at the point in the calibration sequence when the calibrated attenuator is stopped down one stop from wide open (ƒ-5.6), the uncalibrated attenuator is up high enough to accommodate a level of green light transmitted by the unknown transparency that is only half that transmitted by the standard transparency, the standard transparency is in place, the diffuser is in the light path, and selector switch 38 is set on contacts G—G as shown to activate the "green" loop of the voltage-divider circuit. We then merely adjust variable resistor 40G to the point of lamp extinction thus calibrating the comparator to the level of green light illumination falling thereon from the standard transparency.

Now, while we could leave the iris diaphragm set at ƒ-5.6 while we calibrate the comparator to the levels of illumination of the red and blue light transmitted by the standard transparency, to do so would mean that we would have to let ƒ-5.6 equal three different time intervals instead of just one. In other words, we have already decided that ƒ-5.6 equalled a 20 second green exposure for purposes of calibrating the comparator to the level of green light transmitted by the standard transparency but now if we stick with ƒ-5.6 for the blue and red calibrations it must change value and become equal to a 10 second time interval for the blue component and a 25 second one for the red. This unnecessarily complicates the calibration sequence as well as the subsequent time interval determination for the blue and red components; therefore, a far simpler and better approach is to set the iris diaphragm at ƒ-stops for the blue and red components that bear the same relationship to ƒ-5.6 used for the green as the predetermined blue and red exposure intervals bear to the 20 second green exposure interval. Thus, if ƒ-5.6 corresponds to a 20 second green exposure time and we have a 10 second blue one determined from the trial-and-error print, our time ƒ-stop scale tells us the proper aperture setting for the blue calibration step if ƒ-5.6 not ƒ-5.6.

The exact same thing is true of the red exposure calibration step. We have already found that the proper interval for the red exposure was 25 seconds so, instead of calibrating our comparator so that a setting of ƒ-5.6 on the enlarger lens iris diaphragm equalled 25 seconds instead of 20 seconds as it was for the green calibration step, we merely open up the lens by one-third of an *f*-stop and calibrate the comparator to this level of illumination by setting potentiometer 40R accordingly.

Having done this, when we match the levels of illumination of red and blue light transmitted by the unknown transparency to the calibrated levels set into the comparator, the corresponding *f*-stop or time that appears on the enlarging lens scale will be the corrected one to use on the red and blue timers when making a print from the unknown transparency. Thus, all interpolation is avoided and the scale reads-out directly in the proper time interval. The alternative approach is, of course, to determine the differences in levels of red and blue illumination as compared to those of the standard in terms of *f*-stop adjustments and convert these differences to time interval corrections but this is unnecessarily complicated and confusing.

Had we not already calibrated to the overall level of illumination used in making the satisfacory print, we would have to do so now by removing the diffuser, raising the enlarger back up to the height it was while making the trial-and-error print, closing down the iris diaphragm to its former setting and refocusing the full color image preparatory to taking a white-light illumination level reading with probe 14 or its equivalent in a suitable shadow area. Performing this operation first has obvious advantages as we needn't go to the trouble of recording and attempting to reproduce the exact same conditions under which the trial-and-error print was made.

Our next step is to replace the standard transparency with the unknown one and, with the diffuser still in place and the lens diaphragm still set at an iris opening of *f*–5.6 (20 seconds), we balance the level of green light illumination by moving the head up or down as required. Once the point of extinction of the lamp has been reached, the levels of green light illumination from both the standard and unknown transparencies have been matched and, most important, we have validated the scale on the diaphragm such that *f*–5.6 means precisely the same thing it did while making the acceptable print from the standard transparency. In other words, while the trial-and-error print was, in fact, made at a different degree of image magnification and a different (smaller) aperture setting, had it been made at *f*–5.6 and the degree of image magnification chosen for calibration purposes, the green light intensity would have been the same as the reference level to which the green light from the unknown transparency is equated.

Having validated the scale as above noted, we proceed to use the iris diaphragm of the enlarger lens to equate the levels of illumination of the red and blue components. If we assume the previous conditions, we would find that the red level of illumination matched that of the standard when the iris was set about a third of the way down toward *f*–5.6 from *f*–4.0. If the *f*-stop scale included a time scale, this would correspond to an exposure time of 32 seconds. Alternatively, we would find a corresponding point on the timers *f*-stop scale and see that it equalled 32 seconds. Actually, we can leave the time scale off altogether, the advantage of the latter being it is divided up into smaller increments, those shown corresponding to ⅓ *f*-stops. Either way, we end up with a corrected red exposure time in which, due to a slightly denser red component in the unknown transparency than we had in the standard, it was necessary to increase the interval from 25 up to 32 seconds.

Next, we will perform the exact same operation with respect to the blue component of light transmitted by the unknown transparency. Using the iris diaphragm as our calibrated attenuator, the point of lamp extinction should occur at *f*–11 if we assume the same conditions as before meanining, of course, that the blue light transmitted by the unknown transparency had twice the level of illumination as that of the standard and required only half the exposure interval.

At long last, we have three exposure times for the red, blue and green components of the unknown transparency and these times remain the same regardless of the degree of image magnification we select for the final print. One unknown remains, namely, the degree of overall light-flux attenuation which, at the select degree of image magnification, will produce a level of illumination for all three components that can be multiplied by the exposure times to produce the quantities of red, green and blue light at the appropriate emulsion layers of the print necessary to satisfy our requirements.

The final step, of course, is to remove the diffuser and raise or lower the enlarger to the chosen degree of image magnification for the final print. Having done so, the iris of the enlarger lens diaphragm is, once again, reset to attenuate all three color components equally such that the white light illumination level reaching the surface of the print at the chosen spot thereon remains substantially the same as it was while making the acceptable print from the standard transparency. The spot-intensity probe is used for this purpose and all three predetermined time intervals remain the same, the only difference being that we have a new iris setting.

What is claimed is:

1. The method of determining the exposure intervals required to reproduce a standard color balance in a print made from an unknown positive or negative color transparency which comprises the steps of: making a satisfactory color print by trial-and-error from a preselected standard transparency to establish time intervals for a set of three primary color components thereof at an arbitrarily-chosen degree of image magnification and overall light-flux attenuation that will define an acceptable color balance for use as a standard; diffusing the full-color focused image used to make the print to the extent required to mix the components thereof; selectively filtering the diffused image to separate same into said primary components; determining the illumination levels for all three of said components at the same known degree of image magnification; substituting the unknown transparency for the standard; projecting a full-color diffused image of the latter at the same known degree of image magnification at which the illumination levels of the components of the standard transparency were determined; selectively filtering said diffused image into the same primary color components into which the image from the standard transparency was separated; choosing a time interval for one component of the unknown transparency that is equal to the time interval for the like component of the standard used in making the satisfactory print therefrom; varying the illumination levels of all three components equally without changing the degree of image magnification until the illumination level of said chosen component equals the predetermined illumination level of the like component from the standard transparency; comparing the illumination levels of the remaining two components of the unknown transparency with the predetermined illumination levels of their counterparts from the standard transparency to determine the magnitude of any differences therebetween; and, correcting the time intervals for said two remaining components so as to compensate for such differences in illumination levels as were determined to exist, the one chosen and two determined component time intervals cooperating with one another to define a set of exposure intervals for the unknown transparency which will reproduce the color balance adopted as a standard at any arbitrarily chosen degree of image magnification and common degree of light-flux attenuation.

2. The method as set forth in claim 1 which includes the steps of: decreasing the degree of image magnification or light-flux attenuation to increase the overall level of illumination preparatory to determining the levels of illumination of said three primary components of the standard transparency; attenuating the illumination levles of all three of said primary components of the unknown transparency to the same degree the illumination levels of the corresponding components of the standard transparency were attenuated when the illumination levels thereof were determined; and, independently further varying the illumination levels of the previously-attenuated components equally until the illumination level of the chosen component equals the predetermined illumination level of the like component of the standard transparency before comparing the illumination levels of the remaining two components of the unknown with the like components of the standard to determine the differences in the levels of illumination therebetween.

3. The method as set forth in claim 1 in which: the illumination levels of the components of the standard transparency are determined when their relative degrees of light-flux attenuation bear a relationship to one another that is inversely proportional to their predetermined exposure intervals.

4. The method as set forth in claim 2 in which: the illumination levels of the components of the standard transparency are determined at said increased level of illumination and when their relative degrees of light-flux attenuation bear a relationship to one another that is inversely proportional to their predetermined exposure intervals.

5. The method of determining the exposure intervals required to reproduce a standard color balance in print from an unknown positive or negative color transparency which comprises the steps of: making a satisfactory color print by trial-and-error from a preselected standard transparency to establish time intervals for the red, blue and green components thereof at an arbitrarily-chosen degree of image magnification and overall light-flux attenuation that will define an acceptable color balance for use as standard; decreasing the degree of image-magnification or light-flux attenuation or both to increase the overall level of illumination; diffusing the fullcolor focused image used to make the print to the extent required to mix the red, blue and green components thereof; selectively filtering the diffused image to separate same into its red, blue and green components; determining the illumination level for one of said components at said overall increased level of illumination; attenuating the light-flux at said overall increased level of illumination without changing the degree of image magnification until the relative degrees of light-flux attenuation of said one component and a second component of the three bear a relationship to one an that is inversely proportional to their predetermined exposure times; determining the level of illumination of said second component at said modified degree of light-flux attenuation; further attenuating the light-flux at the same degree of image magnification until the relative degrees of light-flux attenuation of said one component and the last of the three bear a relationship to one another that is inversely proportional to their predetermined exposure times; determining the level of illumination of said last component at said further modified degree of light-flux attenuation; substituting the unknown transparency for the standard; projecting a full-color diffused image of the latter; selectively filtering said diffused image into its red, green and blue components; choosing a time interval for one component of the unknown transparency that is equal to the time interval for the like component of the standard used in making the satisfactory print therefrom; attenuating the illumination levels of all three components of the unknown transparency to the same degree the illumination level of the component from the standard transparency corresponding to said chosen component from the unknown transparency was attenuated when the illumination level thereof was determined; independently further varying the illumination levels of the previously attenuated components equally until the illumination level of said chosen component equals the predetermined illumination level of the like component from the standard; comparing the illumination levels of the remaining two components of the unknown transparency with the predetermined illumination levels of their counterparts from the standard transparency to determine the magnitude of any differences therebetween; and, correcting the time intervals for said two remaining components so as to compensate for such differences in illumination levels as were determined to exist, the one chosen and two determined component time intervals cooperating with one another to define a set of exposure intervals for the unknown transparency which will reproduce the color balance adopted as a standard at any arbitrarily chosen degree of image magnification and common degree of light-flux attenuation.

6. The method as set forth in claim 5 in which: the overall level of illumination is increased by decreasing both the degree of image magnification and the degree of light-flux attenuation.

7. The method as set forth in claim 5 in which: the step of independently varying the illumination levels of the previously-attenuated components is accomplished by varying the degree of image magnification.

8. The method as set forth in claim 5 which includes the steps of determining the level of illumination of the white light falling on a selected area of the focused image used in making the satisfactory print from the standard transparency; projecting a full color focused image of the subject matter depicted in the unknown transparency at the degree of image magnification chosen for the final print to be made therefrom; selecting an area of the focused image of the unknown transparency comparable to that in the focused image from the standard transparency at which the white-light illumination level determination was made; and, varying the level of illumination of the white light reaching the selected area of the focused image from the unknown transparency until it equals the predetermined level of illumination of the white light that fell on the comparable area of the focused image from the standard, the degree of white light-flux thus determined being adapted to cooperate with the previously-determined component time intervals to define a set of exposure parameters for the unknown transparency adjusted to compensate for the change in the degree of image magnification chosen for the final print that resulted in the level of illumination of the chosen component to differ from that which existed when it was matched to the like component from the standard transparency.

9. The method as set forth in claim 5 which includes the steps of: arbitrarily selecting a factor by which the density of the chosen component from the unknown transparency may exceed that of the like component from the standard; and, decreasing the degree of image magnification to point where the overall level of illumination can still be further increased to accommodate an unknown transparency having a chosen component density greater than the standard by said factor and still permit said chosen component illumination levels to be balanced.

10. The method as set forth in claim 9 which includes the steps of: arbitrarily selecting a factor by which the density of one or both of said remaining components from the unknown transparency may exceed that of the like components from the standard; and, decreasing the degree of light-flux attenuation independently of the degree of image magnification to a point where the overall level of illumination can still be further increased to accommodate an unknown transparency having one or both of its remaining components denser than the corresponding components of the standard by said factor and still permit said remaining like component illumination levels to be balanced.

11. The method as set forth in claim 9 in which: the arbitrarily chosen factor by which the density of the chosen component of the unknown transparency may exceed that of the chosen component of the standard is not less than two nor greater than three.

12. The method as set forth in claim 9 in which: the arbitrarily chosen factor by which the density of the chosen component of the unknown transparency may exceed that of the chosen component of the standard is approximately two.

13. The method as set forth in claim 10 in which: the arbitrarily chosen factor by which the density of one or both of said remaining components of the unknown transparency may exceed that of the like components of the standard is not less than two nor greater than three.

14. The method as set forth in claim 10 in which: the arbitrarily chosen factor by which the density of one or both of said remaining components of the unknown transparency may exceed that of the like components of the standard is approximately two.

15. The method as set forth in claim 11 in which: the arbitrarily chosen factors by which the density of any of the three components of the unknown transparency may exceed that of the standard is not less than two nor greater than three.

16. The method as set forth in claim 11 in which: the arbitrarily chosen factors by which the density of any of the three components of the unknown transparency may exceed that of the standard is approximately two.

* * * * *